MAGNETIC TAPE CARTRIDGE PLAYER SYSTEM

Filed March 13, 1968

2 Sheets-Sheet 1

INVENTOR
WILLIAM P. LEAR
By Richard A. Marsen
his ATTORNEY

MAGNETIC TAPE CARTRIDGE PLAYER SYSTEM

Filed March 13, 1968 2 Sheets-Sheet 2

INVENTOR
WILLIAM P. LEAR,

By Richard A. Marsen
his ATTORNEY 3,560,126

MAGNETIC TAPE CARTRIDGE PLAYER SYSTEM

William P. Lear, Beverly Hills, Calif., assignor to Gates Learjet Corporation, Wichita, Kans., a corporation of Delaware

Continuation-in-part of application Ser. No. 494,645, Oct. 11, 1965. This application Mar. 13, 1968, Ser. No. 712,648

The portion of the term of the patent subsequent to Oct. 1, 1985, has been disclaimed

Int. Cl. G11b *23/06;* B65h *17/48*

U.S. Cl. 242—55.19 11 Claims

ABSTRACT OF THE DISCLOSURE

The player accommodates magnetic tape cartridges with the tape arranged in endless array. The cartridge is in rectangular form, and is inserted in an opening of the player for direct engagement in the play mode. A recess or V-notch in one side of the cartridge coacts with a prepositioned retention member biased into the opening. The member engages the notch to provide a substantial forward force component that presses an exposed tape portion against the drive capstan and for transcription by a pick-up head, and simultaneously provides a lateral force component that presses the cartridge against an opposite side guide that holds the cartridge in stable play position.

This invention relates generally to player systems for magnetic tape cartridges, and more particularly to novel players of endless tape cartridges for ready stable play in vehicles as well as the home. This patent application is a continuation-in-part of my copending patent application for "Magnetic Tape Cartridge System," Ser. No. 494,-645 filed Oct. 11, 1965, now Pat. No. 3,403,868, which in turn is a division of my patent application for "Magnetic Tape Cartridge," Ser. No. 393,083, now Pat. No. 3,350,025, and is related to copending patent application for "Combined Radio and Magnetic Tape Player," Ser. No. 494,647, filed on Oct. 11, 1965, now Pat. No. 3,400,-227, all of said patent applications being assigned to the assignee hereof.

Record players for vehicles should preferably be simple to operate and require a minimum of handling or attention by the driver. Disc records have been tried in automobiles without success because of the bumps and turns in riding. Magnetic tape recordings overcome needle bounce, but have heretofore been relatively complex to play on the road. Further, the associated player equipment was bulky, and not convenient for automobile use.

In accordance with the present invention the magnetic tape is used on individual reels in endless array, each within a cartridge. Quality stereophonic or monaural music, hours in length, is recordable on each such reel, within a cartridge that is light in weight and smaller in size than a pocket paperback book. The player hereof contains a tunnel opening into which the cartridge is inserted for play. A retention member, as a roller, is biased into the tunnel from one side at a predetermined intermediate location. The cartridges each contain a recess at the corresponding side. The recess has an inclined surface positioned to coact with the retention member to provide a substantial longitudinal force that engages the magnetic tape in the play mode, and simultaneously a lateral force to firmly hold the cartridge in the player against the opposite tunnel side.

The player hereof, even combined with a radio, can readily be fitted behind the dashboard of an automobile, in the space and position of the usual radio alone. The radio and player controls are all directly accessible to the car driver. The slot into which the cartridge is inserted for play is positioned adjacent to the radio tuning dial. Full insertion of the cartridge effects its latch-in and playback, automatically. Its full or partial release permits radio play through the common amplifier-speaker set-up in the car. The cartridge region within the chassis is proportioned and arranged to closely fit about the cartridge, to guide it into the operative position. When its end reaches the capstan, the retention roller grips the cartridge to firmly hold it in precise play relation, and the drive and play circuits become energized. Track advancement is automatically performed at the end of the previous one; or manually by pushbutton at the dashboard controls.

The aforesaid features, advantages, and objects of the present invention will become more apparent from the following description of an exemplary embodiment thereof, illustrated in the drawings, in which.

Figure 1:
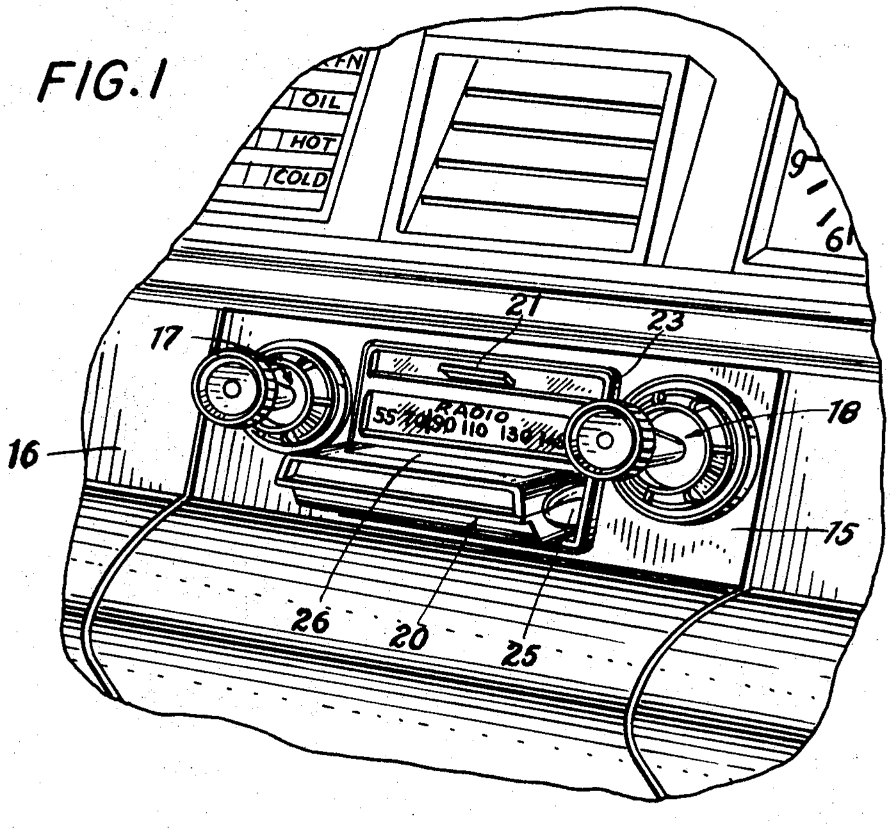
FIG. 1 is a perspective illustration of the exemplary player combined with a radio, installed in an automobile dashboard, with a cartridge inserted in play position.
Figure 2:
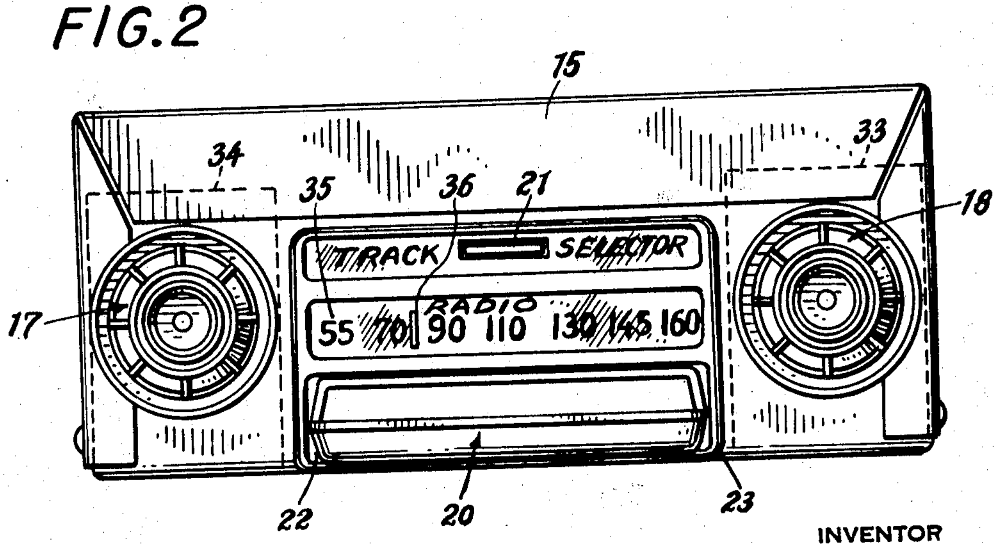
FIG. 2 is the front view of the player of FIG. 1.

Referring to the figures, the player unit 15, combined with a radio, is arranged to be readily mounted behind the dashboard 16 of an automobile. It is compact, integrated, and efficient in construction and accessibility, in accordance with the present invention. The unit is controlled through two knob sets 17 and 18, as well as the position of a cartridge 20 positioned within it. While the knob control arrangement is optional, their functions in the exemplary system are: (a) on-off overall switch, and volume setting (by the front knob of left set 17), and (b) tone control (by the back one); (c) radio station selection or tuning (by the front knob of right set 18), and (d) stereophonic balance among the speakers (by the back one). System control by the cartridge (20) position, and the track selector switch (21), will be set forth in detail hereinafter.

The magnetic tape cartridge 20 is shown in the "play" position, pressed into its innermost place within the radio-player unit 15. The cartridge fits through an opening or slot 22 in the front bezel 23 and space 24 within the unit 15, therefor. The cartridge 20 contains a finger grip 25, 25 near its front, at each side for its convenient insertion and removal. A transverse groove 26 adjacent the top front of the cartridge further facilitates its handling. Cartridge 20 is firmly and stably held in "play" position by retention roller 27 pressed into a notch 28 integrally formed in its side, by leaf spring 29. Physical details of such cartridge are shown and described in the copending patent application of William P. Lear for "Magnetic Tape Cartridge," Ser. No. 393,083, filed on Aug. 31, 1964, issued as Pat. No. 3,350,025 on Oct. 31, 1967, and assigned to the same assignee.

Figure 4:
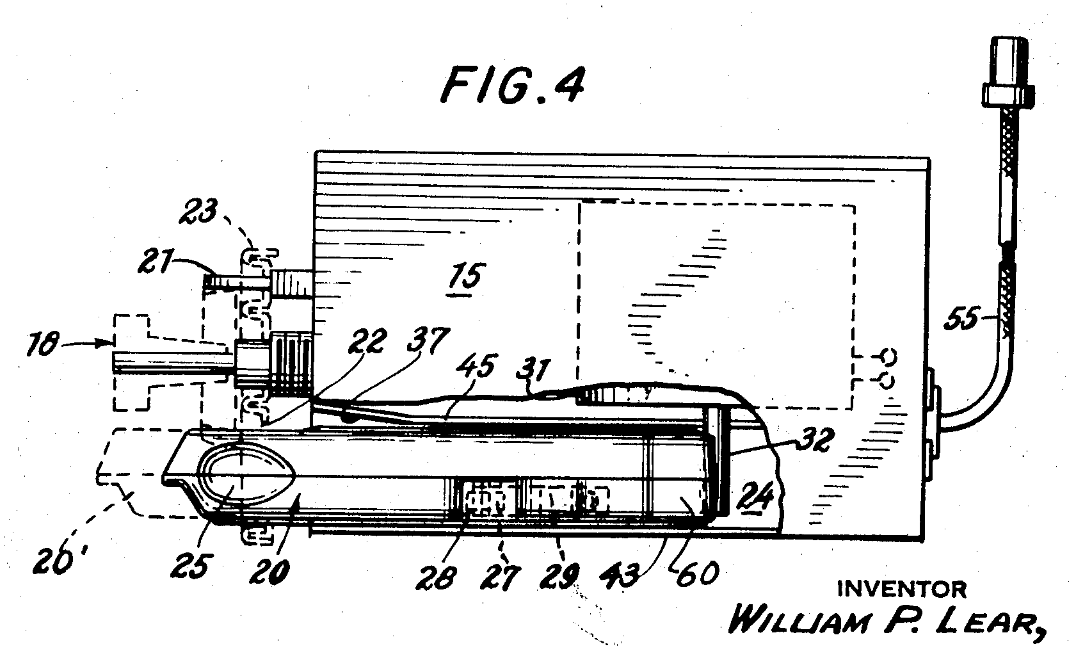
FIG. 4 is a side view of the exemplary player, partially cut-away to show the cartridge therein.

The structural compactness of unit 15 is rendered feasible, in part, by the use of transistors and small circuit components for the amplifiers and the contained motor speed control circuit. Further, the direct motor drive (31) of the magnetic tape 30 of cartridge 20, by capstan-shaft 32, see FIG. 4, materially reduces the number of mechanical components and requisite space therefor.

The radio tuner-detector module 33 is fitted along one side of the chassis unit 15; the stereo dual-signal amplifier 34 along the other side. The sizable drive motor (31), and head track shift mechanism (not shown), are located in the space between the circuit sections 33, 34. The remaining circuit elements are readily arranged within the unit 15. The radio dial 35 is central, linear and horizontally disposed. A station indicator 36 moves across dial 35. The cartridge slot 22 is elongated and parallel across the radio dial 35. The handling of cartridge 20 centrally of the unit 15, and adjacent the radio dial, affords direct and convenient control of radio and record play while riding. Both the radio (35) and the tape cartridge (20) are directly controlled by simply reaching out with one's right hand.

The magnetic tape cartridge 20 is picked-up by thumb and forefinger across grip cavities 25, 25 or at top groove 26 and front-bottom. The cartridge is inserted through slot 22. The frontal portion 37 of an upper plate is tilted upwardly at an angle to facilitate cartridge insertion into the unit 15. When fully inserted, a corner 40 of the cartridge front section is pressed against a stop 38, the retention roller 27 snaps into notch 28. The stop 38 is adjustable through nut 39 on a fixed post. This predetermines the play-position of the magnetic tape 30 with the capstan 32 and the pick-up head 41. Towards this end, a side-guide 42 is arranged parallel to the cartridge 20, in the unit 15, very close to the cartridge when it is inserted. The use of a stop (38) is optional, as the press of the cartridge roller 50 against the capstan 32 provides a satisfactory stop function. The cartridge is held in practical play relation through retention roller 27, with tape 30 in play position with transducer head 41, and transversely moved by the capstan-roller array.

Figure 3:
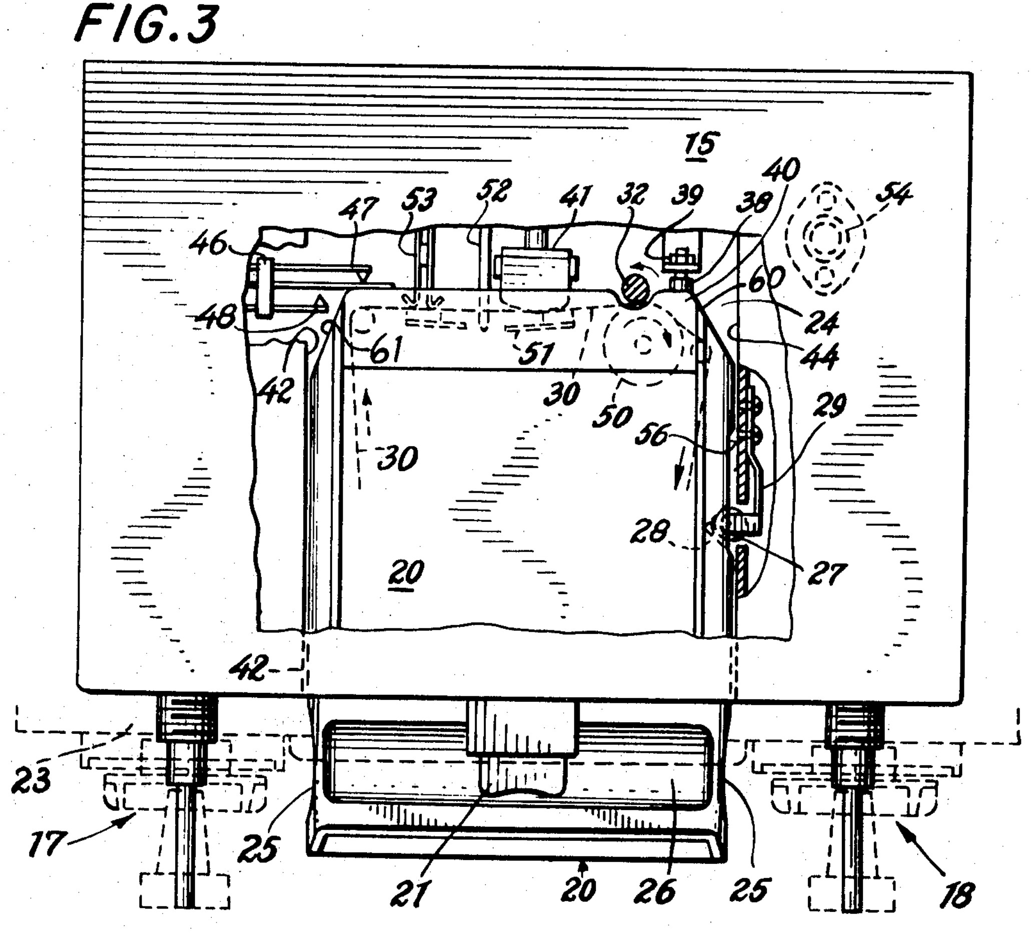
FIG. 3 is the top view of the player of FIGS. 1 and 2, cut-away to show its interior components in coaction with the inserted cartridge, in play position.

The open space or tunnel 24 for the cartridge is formed by chassis base 43, the side guide 44 on which roller 27 is mounted, the guide 42, and the upper plate 45 that contains lip 37. The spacing between parallel side guides 42 and 44 is a small amount more than the width of the cartridge. In the exemplary player such width, internally between side guides 42, 44 is just .030″ more than the 4.0″ cartridge width. The latched-in cartridge, by roller 27, is shown in FIG. 3, in the tape play position. Roller 27 presses on the forward inclined surface of the V-notch 28, and does not "bottom" in this notch or recess in the longitudinal side thereat of the cartridge 20. There results a forward longitudinal force and a simultaneous lateral one. Cartridge 20 is thus held in a predetermined orientation within tunnel 24, with tape 30 in the play mode. The closely pressed guide 42 holds it in proper parallel position: and the capstan 32 and/or stop 38, in proper inward tape play location. The roller 27 thus retains the cartridge firmly and stably in this "play" position, even during tough travel conditions, including bumps along the road.

When the cartridge 20 is in the "play" position, the selection switch 46 is closed upon its outer tape-play contact 47, as shown in FIG. 3. With the "on" switch actuated by its knob (at 17), the closure of contact 47 energizes the circuits for the meter (31) drive and the magnetic tape reproduction in a suitable manner as understood by those skilled in the art. When the cartridge is in its "ready" or "hold" position, shown at 20′ in dotted lines in FIG. 4, the switch 46 is closed on its lower contact 48 for radio-play operation.

The capstan 32 presses against the contained pinch roller 50 with the tape 30 therebetween. Rotation of capstan 32 by motor 31 transports the tape longitudinally across head 41, pressed thereto by a pad 51. The tape 30 is on a reel (not shown) in the cartridge 20, in endless configuration, as in the said patent. A tape guide 52 projects across the tape 30 to hold it at a fixed height, as a reference for the track shift mechanism for head 41, within the unit. Such mechanism is shown in our copending patent application for "Track Shifting Mechanism for Magnetic Tape," Ser. No. 392,213, filed on Aug. 26, 1964, and assigned to the same assignee. The head 41 is shifted successively, laterally of the tape, track by track, upon actuation of contacts 53 by a suitable conductive patch on the tape at its track end/start recording region as shown in the latter patent application.

The radio antenna lead is suitably plugged-in at connector 54. The external connections to unit 15 are made by a cable 55: to the battery, and the loudspeakers. The magnetic tape 30 plays when the cartridge is in the "play" position with unit 15, as shown in solid lines in the figures, when the set-switch is "on" at 17, as aforesaid. It plays, track-after-track, automatically; being manually shiftable, at option, through track selector switch 21 that over-rides the contactor 53 in the manner set forth in the latter referred to patent application.

The cartridge 20 is held in readiness-to-play in unit 15, when its auxiliary notch 56 is engaged with retention roller 27. This occurs when the cartridge is in the dotted position 20′ shown in FIG. 4. The selector switch 46 thereupon closes at contact 48 to circuitally effect radio-play. The roller 27 prevents cartridge 20 from slipping out of unit 15 when in the readiness position 20′. Tape record-play is quickly accomplished by simply pressing the cartridge full-in, to the solid position 20, as will now be understood. Cartridge replacement is readily performed through the finger grips 25, 25 and 26.

An inclined corner or ramp 60 of the cartridge 20 engages retention roller 27 as it is inserted through the slotted opening 22. The ramp 60 is proportioned to cause the roller 27 to ride onto and along the side of the cartridge, and thereupon engage the notch 56 or 28. The ramp 60 is important for this purpose for the easy use and direct manipulation of the tape cartridge (20) in the player system (15). A second inclined corner 61 is symmetrically located on the left side of the cartridge 20 opposite ramp 60. The cartridge not only appears more esthetic therewith, but both forward corners 60, 61 inclined in this manner facilitate the insertion of the cartridge into the slotted opening 24 of the player with a minimum of concentration and handling. The magnetic tape cartridge-player system of this invention is as readily operated as is the accompanying radio. Either the radio or the cartridge-player hereof is directly reached, controlled and used, with one hand, even while driving the automobile.

Although the present invention has been described in connection with an exemplary embodiment, changes and modifications may be made within the broader spirit and scope of the invention, as set forth in the following claims.

What is claimed is:

1. A magnetic tape player for a cartridge containing a reel of tape in endless array with an exposed portion for coaction with the player, said player comprising a chassis, magnetic tape drive means supported in the chassis including a capstan, a pick-up head, and a single retention member for stably positioning and holding the cartridge in full play coaction with the tape drive capstan and pick-up head; said capstan and pick-up head being positioned at the interior end of a tunnel opening in the chassis for pressing against the exposed tape portion of the cartridge when inserted and held in the tunnel opening; said retention member being predeterminedly mounted at the side of the tunnel opening that is nearer said capstan and at a longitudinal distance from said capstan, said retention member being spring biased into the tunnel for engaging with the cartridge at its corresponding side when inserted therein; and a side guide at the tunnel opening located opposite its first said side; said retention member being arranged for displacement by a corner ramp of the cartridge upon its insertion in the tunnel and for engaging the cartridge at a recessed region in its said corresponding side that contains an inclined surface, said retention member thereupon coacting with said inclined surface to develop a sole forward force on the cartridge to press its exposed tape portion into play relation with said pick-up head and into firm tape drive relation with said capstan, and to simultaneously develop a sole lateral force on the cartridge that holds it in firm stable relation against said side guide in the play mode in the player.

2. A magnetic tape player as claimed in claim 1, in which said retention member comprises a roller adapted to rotate along the said corresponding side of the cartridge upon its insertion in or removal from the player.

3. A magnetic tape player as claimed in claim 1, in which said retention member comprises a roller and a spring that presses it against the said corresponding side of the cartridge upon its insertion in the player wherein said spring biases said roller into engagement with the said inclined surface of said cartridge recess to hold the cartridge in said firm stable play relation against said capstan, pick-up head and side guide.

4. A magnetic tape player as claimed in claim 2, in which said roller is of cylindrical form with its axis of rotation arranged substantially parallel to said capstan.

5. A magnetic tape player as claimed in claim 3, in which said roller is of cylindrical form, and a pin supported by said spring and rotatably carrying said roller with its axis of rotation substantially parallel to said capstan.

6. A magnetic tape player as claimed in claim 1, in which a second region in the cartridge adjacent to its said recessed region is coactable with said retention member for physically holding the cartridge in said tunnel opening displaced from said capstan in out of tape play relation.

7. A magnetic tape player as claimed in claim 1, in which the cartridge contains a housing of substantially rectangular form with parallel longitudinal sides one of which contains the said recessed region that coacts with said retention member, the width of said cartridge across its said parallel sides being nearly that which is effectively between the first said side of the tunnel opening and the said side guide, whereby the cartridge is stably pressed into predetermined capstan play coaction for longitudinal transport of its exposed tape portion across the said pick-up head and held firmly in said tunnel opening during the play mode.

8. A magnetic tape player as claimed in claim 1, in which the cartridge contains a housing of substantially rectangular form with parallel longitudinal sides one of which contains the said recessed region that coacts with said retention member, a pinch roller mounted in said housing at a frontal opening thereof adjacent the said one longitudinal side which contains said recessed region for pressing the said exposed tape portion against said capstan for longitudinal transport of the tape, whereby the said forward force developed by the coaction of said retention member and said inclined cartridge recess surface is directed substantially to press said pinch roller against said capstan for said tape transport during the play mode engagement of the cartridge in the player.

9. A magnetic tape player as claimed in claim 7, wherein said retention member is the sole retention means for engaging the cartridge into the said positioning and holding mode for stable tape play in the player, and wherein the said recessed region contains the sole inclined surface in the cartridge that coacts with retention means, to firmly and stably hold the cartridge in its tape play mode in said tunnel of the player.

10. A magnetic tape player as claimed in claim 8, wherein said retention member is the sole retention means for engaging the cartridge into the said positioning and holding mode for stable tape play in the player, and wherein the said recessed region contains the sole inclined surface in the cartridge that coacts with retention means, to firmly and stably hold the cartridge in its tape play mode in said tunnel of the player.

11. A magnetic tape cartridge player comprising a chassis; magnetic tape drive means supported in the chassis and including a tape drive capstan; a pick-up head, a cartridge containing a reel of magnetic tape in endless array with tape portions exposed at open regions of its front wall; said capstan and pick-up head being positioned at the interior end of a tunnel opening in the chassis for coaction with the said exposed tape portions when in the play mode; and a single retention member for stably positioning and holding said cartridge in the tunnel opening in the said play mode; said retention member being mounted at the side of the tunnel opening that is nearer said capstan and at a predetermined longitudinal distance from said capstan, said retention member being biased into the tunnel for engaging with the cartridge at its corresponding side when inserted therein; and a side guide at the tunnel opening located opposite its first said side; said cartridge having ramp means at its corner that is adjacent the capstan for displacing said retention member upon insertion into the tunnel whereby said member is pressed along the corresponding cartridge longitudinal side; said cartridge containing a recess in said longitudinal cartridge side at a position for engagement with the retention member when the cartridge is inserted in the tunnel in its tape play position, said recess being formed with an upstanding wall projecting inwardly from said longitudinal side and at a substantial angle thereto, said upstanding wall being arranged to coact with said retention member to provide a sole force component forward of the cartridge to directly press the exposed tape portions against the drive capstan to firmly transport the tape and to simultaneously provide a sole force component laterally of the cartridge for pressing the second longitudinal cartridge side against said tunnel side guide, and thereby stably positioning and holding the cartridge in the play mode in the player.

References Cited

UNITED STATES PATENTS

| | | | |
|---|---|---|---|
| 3,311,316 | 3/1967 | Williams | 179—100.2 |
| 3,083,269 | 3/1963 | Gaubert | 179—100.2 |
| 2,804,508 | 8/1957 | Mastling | 179—100.2 |

J. RUSSELL GOUDEAU, Primary Examiner

U.S. Cl. X.R.

179—100.2